US010652016B2

(12) United States Patent
Falco et al.

(10) Patent No.: US 10,652,016 B2
(45) Date of Patent: May 12, 2020

(54) METHODS, APPARATUS, AND SYSTEMS FOR CONTROLLING INTERNET-CONNECTED DEVICES HAVING EMBEDDED SYSTEMS WITH DEDICATED FUNCTIONS

(71) Applicant: NeuroMesh, Inc., Cambridge, MA (US)

(72) Inventors: Gregory J. Falco, Los Altos, CA (US); Caleb Li, Edmond, OK (US); Pavel Fedorov, Seattle, WA (US); Carlos Caldera, Waltham, MA (US); Kelly Jackson, San Francisco, CA (US); Rahul Arora, Seattle, WA (US)

(73) Assignee: NeuroMesh, Inc., Cambridge, MA (US)

( * ) Notice: Subject to any disclaimer, the term of this patent is extended or adjusted under 35 U.S.C. 154(b) by 0 days.

(21) Appl. No.: 16/560,732

(22) Filed: Sep. 4, 2019

(65) Prior Publication Data
US 2020/0014531 A1 Jan. 9, 2020

Related U.S. Application Data

(63) Continuation of application No. PCT/US2018/030255, filed on Apr. 30, 2018.
(Continued)

(51) Int. Cl.
*H04L 9/08* (2006.01)
*G06F 16/11* (2019.01)
(Continued)

(52) U.S. Cl.
CPC .............. *H04L 9/0844* (2013.01); *G06F 3/08* (2013.01); *G06F 16/125* (2019.01); *G06F 21/56* (2013.01);
(Continued)

(58) Field of Classification Search
None
See application file for complete search history.

(56) References Cited

U.S. PATENT DOCUMENTS 10,373,129 B1 * 8/2019 James ................. H04L 67/1042
10,579,643 B2 * 3/2020 Madisetti ................. H04L 9/12
(Continued)

FOREIGN PATENT DOCUMENTS

WO 2018/201147 A2 11/2018

OTHER PUBLICATIONS

International Application No. PCT/US2018/030255, International Search Report and Written Opinion dated Nov. 5, 2018, 33 pages.
(Continued)

*Primary Examiner* — Saleh Najjar
*Assistant Examiner* — Michael W Chao
(74) *Attorney, Agent, or Firm* — Kilpatrick Townsend & Stockton LLP

(57) ABSTRACT

Systems, apparatus, and methods are disclosed for controlling internet-connected devices having embedded systems with dedicated functions. A lightweight software that protects the internet-connected devices from security breaches and security threat is installed on the internet-connected devices. The lightweight software sends network traffic data to a management server via one or more rendezvous servers. The management server analyzes the network traffic data and generates a security update. The security update is posted on a blockchain. The lightweight software obtains the security update in the form of a blockchain transaction.

8 Claims, 6 Drawing Sheets

Related U.S. Application Data

(60) Provisional application No. 62/543,768, filed on Aug. 10, 2017, provisional application No. 62/524,597, filed on Jun. 25, 2017, provisional application No. 62/517,225, filed on Jun. 9, 2017, provisional application No. 62/515,490, filed on Jun. 5, 2017, provisional application No. 62/491,902, filed on Apr. 28, 2017.

(51) Int. Cl.
| | |
|---|---|
| *G06F 3/08* | (2006.01) |
| *G06F 21/62* | (2013.01) |
| *G06Q 20/36* | (2012.01) |
| *H04L 29/06* | (2006.01) |
| *H04L 29/08* | (2006.01) |
| *G06F 21/56* | (2013.01) |
| *H04L 9/30* | (2006.01) |

(52) U.S. Cl.
CPC ........ *G06F 21/568* (2013.01); *G06F 21/6218* (2013.01); *G06Q 20/3678* (2013.01); *H04L 9/30* (2013.01); *H04L 63/0884* (2013.01); *H04L 67/10* (2013.01); *H04L 2209/38* (2013.01); *H04L 2209/56* (2013.01)

(56) References Cited

U.S. PATENT DOCUMENTS

| | | | | |
|---|---|---|---|---|
| 10,581,615 | B2* | 3/2020 | Xie | G06F 21/64 |
| 10,587,628 | B2* | 3/2020 | Setty | H04L 67/10 |
| 10,594,495 | B2* | 3/2020 | High | H04L 9/3247 |
| 2008/0046965 | A1 | 2/2008 | Wright et al. | |
| 2013/0198119 | A1 | 8/2013 | Eberhardt, III et al. | |
| 2014/0157405 | A1 | 6/2014 | Joll et al. | |
| 2016/0085955 | A1 | 3/2016 | Lerner | |
| 2016/0259937 | A1 | 9/2016 | Ford et al. | |
| 2016/0275461 | A1* | 9/2016 | Sprague | G06Q 20/0655 |
| 2017/0017955 | A1 | 1/2017 | Stern et al. | |
| 2017/0034217 | A1 | 2/2017 | Anton et al. | |
| 2017/0075941 | A1* | 3/2017 | Finlow-Bates | H04L 67/104 |
| 2017/0115976 | A1 | 4/2017 | Mills | |
| 2017/0206532 | A1* | 7/2017 | Choi | H04L 67/02 |
| 2017/0344987 | A1* | 11/2017 | Davis | H04L 63/06 |
| 2018/0006826 | A1* | 1/2018 | Smith | H04L 9/3268 |
| 2018/0063238 | A1* | 3/2018 | Zhang | G06F 11/0757 |
| 2018/0176228 | A1* | 6/2018 | He | H04L 63/105 |
| 2018/0219676 | A1* | 8/2018 | Mattingly | H04L 63/08 |
| 2018/0248701 | A1* | 8/2018 | Johnson | H04L 9/3247 |
| 2018/0285217 | A1* | 10/2018 | Smith | G06F 11/0757 |
| 2018/0287797 | A1* | 10/2018 | Banerjee | H04L 9/32 |
| 2018/0337820 | A1* | 11/2018 | Chen | H04L 41/08 |
| 2019/0080392 | A1* | 3/2019 | Youb | H04L 9/0643 |
| 2019/0280872 | A1* | 9/2019 | Falk | G06F 21/64 |

OTHER PUBLICATIONS

International Application No. PCT/US2018/030255, International Preliminary Report on Patentability dated Jul. 1, 2019, 4 pages.

Ali, S.T. et al., "ZombieCoin: Powering Next-Generation Botnets with Bitcoin," In: Financial Cryptography and Data Security. FC 2015. Lecture Notes in Computer Science, vol. 8976, 2015, Springer, Berlin, Heidelberg, 15 pages.

Wain, A. et al., "Towards a Distributed Runtime Monitor for ICS/SCADA Systems," Proceedings of the 4th International Symposium for ICS & SCADA Cyber Security Research 2016 (ICS-CSR), Aug. 2016, DOI: http://dx.doi.org/10.14236/ewic/ICS2016.15, pp. 132-141.

* cited by examiner

METHODS, APPARATUS, AND SYSTEMS FOR CONTROLLING INTERNET-CONNECTED DEVICES HAVING EMBEDDED SYSTEMS WITH DEDICATED FUNCTIONS

CROSS-REFERENCE TO RELATED APPLICATIONS

This application is a bypass continuation of International Patent Application No. PCT/US2018/030255 entitled "METHODS, APPARATUS, AND SYSTEMS FOR CONTROLLING INTERNET-CONNECTED DEVICES HAVING EMBEDDED SYSTEMS WITH DEDICATED FUNCTIONS," filed Apr. 30, 2018, which claims priority to and the benefit of U.S. Provisional Application No. 62/491,902 entitled "SECURITY SYSTEMS FOR IOT DEVICES AND METHODS FOR MAKING THE SAME," filed Apr. 28, 2017, the disclosure of which is incorporated herein by reference in its entirety.

The PCT application claims priority to and the benefit of U.S. Provisional Application No. 62/515,490 entitled "SECURITY SYSTEMS FOR IOT DEVICES AND METHODS FOR MAKING THE SAME," filed Jun. 5, 2017, the disclosure of which is incorporated herein by reference in its entirety.

The PCT application claims priority to and the benefit of U.S. Provisional Application No. 62/517,225 entitled "SECURITY SYSTEMS FOR IOT DEVICES AND METHODS FOR MAKING THE SAME," filed Jun. 9, 2017, the disclosure of which is incorporated herein by reference in its entirety.

The PCT application claims priority to and the benefit of U.S. Provisional Application No. 62/524,597 entitled "SECURITY SYSTEMS FOR IOT DEVICES AND METHODS FOR MAKING THE SAME," filed Jun. 25, 2017, the disclosure of which is incorporated herein by reference in its entirety.

The PCT application claims priority to and the benefit of U.S. Provisional Application No. 62/543,768 entitled "SECURITY SYSTEMS FOR IOT DEVICES AND METHODS FOR MAKING THE SAME," filed Aug. 10, 2017, the disclosure of which is incorporated herein by reference in its entirety.

BACKGROUND

The market for Internet of Things (IoT) is growing at a fast pace (today's 6.4 billion of IoT devices is expected to become 20 billion by 2020). IoT is rapidly being adopted by consumers and enterprises, ranging from WiFi cameras, to baby monitors, to HVAC systems in buildings, etc.

Although IoT devices offer convenience and control, these devices are not protected from malicious actors. A major threat to IoT device proliferation is the lack of security and privacy. For example, in October 2016, Dyn™, a network intelligence firm that manages traffic for Twitter™, Reddit™, and Facebook™ was attacked and forced major websites to be offline for over 30 minutes. Dyn™ was attacked by compromised unsecured IoT devices, including DVRs, baby monitors, and toasters. These unsecured IoT devices were infected by malicious botnets and were remotely controlled to launch a Distributed Denial of Service (DDoS) attack on Dyn™. It is expected that two-third of all enterprises will experience at least one IoT security breach by 2018.

SUMMARY

Methods, apparatus, and systems for controlling internet-connected devices having embedded systems with dedicated functions are disclosed herein. In one implementation, a management system for controlling a plurality of Internet-coupled device nodes comprises at least one first management server communicatively coupled to the Internet and hosting at least a first blockchain wallet and a second blockchain wallet. The first blockchain wallet has at least one first address and conducts first blockchain transactions with the second blockchain wallet. The second blockchain wallet has at least one second address and conducts second blockchain transactions with the first blockchain wallet. The first blockchain transactions include the at least one second address and at least one first node command and/or at least one first node parameter for at least a first device node of the plurality of Internet-coupled device nodes. The first blockchain transactions are posted to a first blockchain. The second blockchain transactions include the at least one first address and at least one second node command and/or at least one second node parameter for at least one of the first device node or at least one second device node of the plurality of Internet-coupled device nodes. The second blockchain transactions are posted to the first blockchain. The management system also includes a plurality of rendezvous servers communicatively coupled to each other, the at least one first management server and the plurality of Internet-coupled device nodes connected via the Internet. The at least one first management server has read access to each rendezvous server of the plurality of rendezvous servers. The first device node of the plurality of Internet-coupled device nodes communicates with at least three rendezvous servers of the plurality of rendezvous servers using a Diffie-Hellman encryption protocol. Each rendezvous server of the at least three rendezvous servers periodically updates a public-private key pair used by the first device node to transmit first device node data to the at least three rendezvous servers. The at least one first management server queries each of the at least three rendezvous servers for the first device node data and uploads a copy of the first device node data to the at least one first management server when a majority of the at least three rendezvous servers has the same first node data.

In one aspect, the first device node constitutes an embedded system with at least one dedicated function and comprises: a memory storing an operating system, dedicated function firmware, and device management firmware. The first device node also comprises a processor coupled to the memory to execute the dedicated function firmware and the device management firmware via the operating system. Upon execution of the dedicated function firmware, the processor controls the first device node to perform the at least one dedicated function. The first device node also comprises a communication interface, communicatively coupled to the processor and the Internet, to facilitate Internet communications between the first device node and the Internet. Upon execution of the device management firmware, the processor of the first device node can control the communication interface to receive, via the Internet, the at least one first node command and/or the at least one first node parameter for at least the first device node included in at least one of the first blockchain transactions, and can implement at least one device management process to control the first device node based at least in part on the at least one first node command and/or the at least one first node parameter.

In one aspect, the system further comprises the first device node. In one aspect, the operating system of the first device node is a Linux-based operating system. In one aspect, a memory size of the device management firmware stored in the memory is less than or equal to 300 kilobytes (KB). In one aspect, a memory size of the device management firmware stored in the memory is between approximately 300 KB and 1.5 megabytes (MB).

In one aspect, the operating system of the first device node includes a kernel, and the device management firmware and the kernel of the operating system have a same privilege level. In one aspect, the memory of the first device node includes a filesystem, and the device management firmware is stored in a hidden folder of the filesystem and/or as a hidden file in the filesystem.

In one aspect, the first Internet-connected device includes at least one of: a sensor, a meter, a regulator, an actuator, a scanner, an image or video acquisition device, a biometric reader, and a card reader. In one aspect, the first Internet-connected device includes at least one of: a sensor, a meter, a regulator, an actuator, a scanner, an image or video acquisition device, a biometric reader, and a card reader. In one aspect, the first device node includes one of: a medical device, a camera, a smart home device, a closed circuit TV/security device, a portable media player, an electronic bracelet, a smart watch, an electric utility device, a water network device, a transportation system device, an oil refinery device, a chemical/manufacturing plant device, an assembly line device, and a mining operation device.

In one aspect, the at least one first node command and/or the at least one first node parameter included in the at least one of the first blockchain transactions constitutes at least one security update for the first device node. The at least one device management process performed by the first device node includes at least one device security process, and upon execution of the device management firmware, the processor of the first device node can control the communication interface to receive, via the Internet, the at least one security update for the first device node included in the at least one of the first blockchain transactions, and implement the at least one device security process to control the first device node based at least in part on the received at least one security update.

In one aspect, the at least one first node command and/or the at least one first node parameter included in the at least one of the first blockchain transactions includes at least one of: at least one whitelisted IP address from which the first device node accepts the Internet communications from the Internet, and at least one blacklisted IP address from which the first device node does not accept the Internet communications from the Internet.

In one aspect, the memory of the first device node further stores at least one command file with the at least one first node command and/or the at least one first node parameter, and the at least one first node command and/or the at least one first node parameter includes at least one of: an add command to add a whitelisted IP address or a blacklisted IP address to the at least one command file, a delete command to delete a whitelisted IP address or a blacklisted IP address from the at least one command file, a whitelisted process that is permitted to be executed as part of execution by the processor of the dedicated function firmware, and a regular expression string corresponding to a malware signature.

In one aspect, the communication interface of the first device node includes a plurality of ports having respective port identifiers. The at least one first node command and/or the at least one first node parameter includes at least one port identifier of at least one port of the plurality of ports for which communications between the first device node and the Internet are blocked. In one aspect, the communication interface of the first device node includes a plurality of ports having respective port identifiers. The at least one first node command and/or the at least one first node parameter includes at least one port identifier of at least one port of the plurality of ports for which communications between the first device node and the Internet are blocked.

In one aspect, the first device node data includes network traffic data relating to Internet communications received and/or transmitted by the communication interface of the first device node. In one aspect, the device management firmware of the first device node includes a packet sniffer. Upon execution by the processor of the first device node of the device management firmware including the packet sniffer, the processor can intercept and analyze IP packets of Internet communications received by the communication interface of the first device node, generate an IP packet log based at least on respective headers of the intercepted and analyzed IP packets, store the IP packet log in the memory of the first device node, and control the communication interface of the first Internet-connected device to transmit the IP packet log as network traffic data included in the first device node data from the first device node to the at least three rendezvous servers.

In one aspect, the device management firmware of the first device node further includes respective IP addresses for the at least three rendezvous servers. Upon execution by the processor of the first device node of the device management firmware, the processor controls the communication interface of the first device node to transmit the IP packet log as the network traffic data from the first device node to the at least three rendezvous servers based at least in part on the respective IP addresses. In one aspect, the copy of the first device node data uploaded to the first management server includes a hash of IP traffic data in the IP packet log.

In one implementation, a management system for controlling at least a first Internet-connected device constituting an embedded system with at least one dedicated function comprises a first management server communicatively coupled to the Internet to transmit, via the Internet, blockchain information for recording on a first blockchain. The blockchain information includes control information for the first Internet-connected device. The first Internet-connected device comprises: a memory storing an operating system, dedicated function firmware, and device management firmware; a processor coupled to the memory to execute the dedicated function firmware and the device management firmware via the operating system, wherein upon execution of the dedicated function firmware, the processor controls the first Internet-connected device to perform the at least one dedicated function; and a communication interface, communicatively coupled to the processor and the Internet, to facilitate Internet communications between the Internet-connected device and the Internet. Upon execution of the device management firmware, the processor of the first Internet-connected device controls the communication interface to receive, via the Internet, the control information for the first Internet-connected device included in the blockchain information, and implements at least one device management process to control the first Internet-connected device based at least in part on the received control information.

In one aspect, the control information, included in the blockchain information and for the first Internet-connected device, includes at least one security update for the first Internet-connected device. The at least one device management process performed by the first Internet-connected device includes at least one device security process. Upon execution of the device management firmware, the processor of the first Internet-connected device controls the communication interface to receive, via the Internet, the at least one security update for the first Internet-connected device included in the blockchain information, and implements the at least one device security process to control the first Internet-connected device based at least in part on the received at least one security update.

In one aspect, the control information, included in the blockchain information and for the first Internet-connected device, includes at least one of: at least one whitelisted IP address from which the first Internet-connected device accepts the Internet communications from the Internet, and at least one blacklisted IP address from which the first Internet-connected device does not accept the Internet communications from the Internet. In one aspect, the memory of the first Internet-connected device further stores at least one command file with at least some of the control information and the control information, included in the blockchain information and for the first Internet-connected device, includes at least one of: an add command to add a whitelisted IP address or a blacklisted IP address to the at least one command file, a delete command to delete a whitelisted IP address or a blacklisted IP address from the at least one command file, a whitelisted process that is permitted to be executed as part of execution by the processor of the dedicated function firmware, and a regular expression string corresponding to a malware signature.

In one aspect, the communication interface of the first Internet-connected device includes a plurality of ports having respective port identifiers, and the control information, included in the blockchain information and for the first Internet-connected device, includes at least one port identifier of at least one port of the plurality of ports for which communications between the Internet-connected device and the Internet are blocked. In one aspect, the first blockchain is a public trustless distributed ledger. In one aspect, the first blockchain is the bitcoin blockchain. In one aspect, the first blockchain is the Ethereum blockchain. In one aspect, the first blockchain is a private blockchain.

In one aspect, the first management server comprises a first blockchain wallet (432a) and a second blockchain wallet. The first management server controls the first blockchain wallet to make first transactions with the second blockchain wallet. The first management server places first control information for at least the first Internet-connected device in first transaction data messages respectively representing the first transactions. The first management server controls the second blockchain wallet to make second transactions with the first blockchain wallet. The first management server places second control information for at least the first Internet-connected device in second transaction data messages respectively representing the second transactions. The first management server transmits, via the Internet, the first transaction data messages and the second transaction data messages for recording on the first blockchain.

In one aspect, the first blockchain is the bitcoin blockchain. The first management server places the first control information for at least the first Internet-connected device in a line of the first transaction data messages using the bitcoin OP_RETURN opcode. The first management server places the second control information for at least the first Internet-connected device in a line of the second transaction data messages using the bitcoin OP_RETURN opcode. In one aspect, the first blockchain wallet is a first bitcoin wallet that includes at least one first private key and at least one first address corresponding to the at least one first private key. The second blockchain wallet is a second bitcoin wallet that includes at least one second private key and at least one second address corresponding to the at least one second private key. The first management server controls the first bitcoin wallet to make the first transactions with the second bitcoin wallet by transferring respective first amounts of bitcoins from the first bitcoin wallet to the second bitcoin wallet. The first transaction data messages include the at least one second address corresponding to the at least one second private key of the second bitcoin wallet. The first management server controls the second bitcoin wallet to make the second transactions with the first bitcoin wallet by transferring respective second amounts of bitcoins from the second bitcoin wallet to the first bitcoin wallet, and the second transaction data messages include the at least one first address corresponding to the at least one first private key of the first bitcoin wallet.

In one aspect, upon execution of the device management firmware, the processor of the first Internet-connected device controls the communication interface to receive, via the Internet, at least some of the control information, and implements the at least one device management process to control the first Internet-connected device based at least in part on the at least some of the control information.

In one aspect, the first Internet-connected device includes at least one of: a sensor, a meter, a regulator, an actuator, a scanner, an image or video acquisition device, a biometric reader, and a card reader. In one aspect, upon execution of the device management firmware, the processor of the first Internet-connected device: controls the communication interface to receive, via the Internet, at least one of the first control information and the second control information, and implements the at least one device management process to control the first Internet-connected device based at least in part on the at least one of the first control information and the second control information.

In one aspect, the operating system of the first Internet-connected device is a Linux-based operating system. In one aspect, a memory size of the device management firmware stored in the memory is less than or equal to 300 kilobytes (KB). In one aspect, a memory size of the device management firmware stored in the memory is between approximately 300 KB and 1.5 megabytes (MB). In one aspect, the operating system of the first Internet-connected device includes a kernel, and the device management firmware and the kernel of the operating system have a same privilege level. In one aspect, the memory of the first Internet-connected device includes a filesystem, and the device management firmware is stored in a hidden folder of the filesystem and/or as a hidden file in the filesystem.

In one aspect, the first Internet-connected device includes at least one of: a sensor, a meter, a regulator, an actuator, a scanner, an image or video acquisition device, a biometric reader, and a card reader. In one aspect, the first Internet-connected device includes one of a medical device, a camera, a smart home device, a closed circuit TV/security device, a portable media player, an electronic bracelet, a smart watch, an electric utility device, a water network device, a transportation system device, an oil refinery device, a chemical/manufacturing plant device, an assembly line device, and a mining operation device.

In one aspect, the management system further comprising a plurality of Internet-connected devices including the first Internet-connected device. Each Internet-connected device comprises: a memory storing an operating system, dedicated function firmware, and device management firmware, a processor coupled to the memory to execute the dedicated function firmware and the device management firmware via the operating system, wherein upon execution of the dedicated function firmware, the processor controls the Internet-connected device to perform the at least one dedicated function, and a communication interface, communicatively coupled to the processor and the Internet, to facilitate Internet communications between the Internet-connected device and the Internet. Upon execution of the device management firmware, the processor of each Internet-connected device: controls the communication interface to receive, via the Internet, at least one of the first control information and the second control information, and implements the at least one device management process to control the Internet-connected device based at least in part on the at least one of the first control information and the second control information.

In one aspect, the first blockchain is the bitcoin blockchain. The first management server places the first control information for at least the first Internet-connected device in a line of the first transaction data messages using the bitcoin OP_RETURN opcode. The first management server places the second control information for at least the first Internet-connected device in a line of the second transaction data messages using the bitcoin OP_RETURN opcode.

In one aspect, the first blockchain wallet is a first bitcoin wallet that includes at least one first private key and at least one first address corresponding to the at least one first private key. The second blockchain wallet is a second bitcoin wallet that includes at least one second private key and at least one second address corresponding to the at least one second private key. The first management server controls the first bitcoin wallet to make the first transactions with the second bitcoin wallet by transferring respective first amounts of bitcoins from the first bitcoin wallet to the second bitcoin wallet. The first transaction data messages include the at least one second address corresponding to the at least one second private key of the second bitcoin wallet. The first management server controls the second bitcoin wallet to make the second transactions with the first bitcoin wallet by transferring respective second amounts of bitcoins from the second bitcoin wallet to the first bitcoin wallet. The second transaction data messages include the at least one first address corresponding to the at least one first private key of the first bitcoin wallet.

In one aspect, upon execution of the device management firmware, the processor of the first Internet-connected device controls the communication interface to receive, via the Internet, at least one of: the first control information in the line of the first transaction data messages using the bitcoin OP_RETURN opcode, based at least in part on the at least one second address in the first transaction data messages, and the second control information in the line of the second transaction data messages using the bitcoin OP_RETURN opcode, based at least in part on the at least one first address in the second transaction data messages.

In one aspect, upon execution of the device management firmware, the processor of the first Internet-connected device controls the communication interface to: transmit first queries via the Internet to a plurality of blockchain explorer websites, retrieve at least some of the first control information from respective websites of the plurality of websites, based at least in part on the at least one second address in the first transaction data messages, transmit second queries via the Internet, to the plurality of blockchain explorer websites, and retrieve at least some of the second control information from respective websites of the plurality of websites, based at least in part on the at least one first address in the second transaction data messages.

In one aspect, a memory size of the device management firmware stored in the memory is less than or equal to 300 kilobytes (KB). In one aspect, the first transactions include a first one of the first transactions. The first management server places a first item of the first control information for at least the first Internet-connected device in a first one transaction data message representing the first one of the first transactions, using the bitcoin OP_RETURN opcode. The first one transaction data message includes the at least one second address corresponding to the at least one second private key of the second bitcoin wallet. The first management server transmits, via the Internet, the first one transaction data message for recording on the first blockchain. At least three of the respective websites of the plurality of websites provide access to the first one transaction data message. Upon execution of the device management firmware, the processor of the first Internet-connected device controls the communication interface to retrieve, via the Internet, the first one transaction data message from the at least three of the respective websites of the plurality of websites, based at least in part on the at least one second address in the first transaction data message; and implements the at least one device management process to control the Internet-connected device based at least in part on the first item of the first control information in the first data transaction message when a majority of the at least three of the respective websites provide access to identical versions of the first one transaction data message.

In one aspect, a memory size of the device management firmware stored in the memory is less than or equal to 300 kilobytes (KB). The device management firmware of the Internet-connected device includes a Simplified Payment Verification (SPV) bitcoin wallet. The first transaction data messages and the second transaction data messages are stored in a plurality of blocks of the first bitcoin blockchain. Each block of the plurality of blocks includes a block header. Upon execution of the device management firmware including the SPV bitcoin wallet, the processor of the first Internet-connected device: controls the communication interface to retrieve via the Internet, from at least one full bitcoin node, a plurality of block headers of at least some of the plurality of blocks; controls the communication interface to send a query, via the Internet, to the at least one full bitcoin node, for at least some of the first transaction data messages and at least some of the second transaction data messages, based at least in part on the second address and the first address, respectively; verifies that the at least some of the first transaction data messages and the at least some of the second transaction data messages are recorded in the first bitcoin blockchain, based on at least some block headers of the plurality of block headers; and implements the at least one device management process to control the Internet-connected device based at least in part on at least one of the first control information in the verified at least some of the first transaction data messages and the second control information in the verified at least some of the second transaction data messages.

In one aspect, upon execution of the device management firmware including the SPV bitcoin wallet, the processor of the first Internet-connected device: controls the communication interface to retrieve via the Internet, from the at least one full bitcoin node, the plurality of block headers of a certain range of the plurality of blocks of the first bitcoin blockchain, based at least in part on timestamps of respective blocks of the plurality of blocks. In one aspect, the at least one of the first control information and the second control information for the first Internet-connected device includes at least one security update for the first Internet-connected device. The at least one device management process performed by the first Internet-connected device includes at least one device security process. Upon execution of the device management firmware, the processor of the first Internet-connected device: controls the communication interface to receive, via the Internet, the at least one security update for the first Internet-connected device; and implements the at least one device security process to control the first Internet-connected device based at least in part on the received at least one security update.

In one aspect, the at least one of the first control information and the second control information for the first Internet-connected device includes at least one security update for the first Internet-connected device. The at least one device management process performed by the first Internet-connected device includes at least one device security process. Upon execution of the device management firmware, the processor of the first Internet-connected device: controls the communication interface to receive, via the Internet, the at least one security update for the first Internet-connected device; and implements the at least one device security process to control the first Internet-connected device based at least in part on the received at least one security update. The at least one of the first control information and the second control information includes at least one of: at least one whitelisted IP address from which the first Internet-connected device accepts the Internet communications from the Internet, and at least one blacklisted IP address from which the first Internet-connected device does not accept the Internet communications from the Internet.

In one aspect, the at least one of the first control information and the second control information includes at least one of: at least one whitelisted IP address from which the first Internet-connected device accepts the Internet communications from the Internet; and at least one blacklisted IP address from which the first Internet-connected device does not accept the Internet communications from the Internet.

In one aspect, the memory of the first Internet-connected device further stores at least one command file with the control information. The least one of the first control information and the second control information includes at least one of: an add command to add a whitelisted IP address or a blacklisted IP address to the at least one command file, a delete command to delete a whitelisted IP address or a blacklisted IP address from the at least one command file, a whitelisted process that is permitted to be executed as part of execution by the processor of the dedicated function firmware, and a regular expression string corresponding to a malware signature.

In one aspect, the memory of the first Internet-connected device further stores at least one command file with the control information. The at least one of the first control information and the second control information includes at least one of: an add command to add a whitelisted IP address or a blacklisted IP address to the at least one command file; a delete command to delete a whitelisted IP address or a blacklisted IP address from the at least one command file; a whitelisted process that is permitted to be executed as part of execution by the processor of the dedicated function firmware; and a regular expression string corresponding to a malware signature.

In one aspect, the communication interface of the first Internet-connected device includes a plurality of ports having respective port identifiers. The at least one of the first control information and the second control information includes at least one port identifier of at least one port of the plurality of ports for which communications between the Internet-connected device and the Internet are blocked.

In one aspect, the management system further comprises a plurality of rendezvous servers communicatively coupled to each other and, via the Internet, to the first management server and the first Internet-connected device. The communication interface of the first Internet-connected device communicates with at least three rendezvous servers of the plurality of rendezvous servers using a Diffie-Hellman encryption protocol based on a public-private key pair to transmit first device data from the first Internet-connected device to the at least three rendezvous servers. The first management server queries each rendezvous server of the at least three rendezvous servers for the first device data and uploads a copy of the first device data to the first management server when a majority of the at least three rendezvous servers has the same first device data.

In one aspect, each rendezvous server of the at least three rendezvous servers periodically updates the public-private key pair used by the first Internet-connected device to transmit the first device data to each rendezvous server of the at least three rendezvous servers. The first device data includes network traffic data relating to Internet communications received and/or transmitted by the communication interface of the first Internet-connected device. In one aspect, the device management firmware of the first Internet-connected device includes a packet sniffer. Upon execution by the processor of the first Internet-connected device of the device management firmware including the packet sniffer, the processor: intercepts and analyzes received IP packets of the Internet communications received by the communication interface of the first Internet-connected device; generates an IP packet log based at least on respective headers of the intercepted and analyzed received IP packets; stores the IP packet log in the memory of the first Internet-connected device; and controls the communication interface of the first Internet-connected device to transmit the IP packet log as the network traffic data from the first Internet-connected device to the at least three rendezvous servers.

In one aspect, the device management firmware of the first Internet-connected device further includes respective IP addresses for the at least three rendezvous servers. Upon execution by the processor of the first Internet-connected device of the device management firmware, the processor controls the communication interface of the first Internet-connected device to transmit the IP packet log as the network traffic data from the first Internet-connected device to the at least three rendezvous servers based at least in part on the respective IP addresses. In one aspect, the copy of the first device data uploaded to the first management server includes a hash of IP traffic data in the IP packet log. In one aspect, the first management server analyzes the copy of the first device data using at least one machine learning (ML) clustering algorithm to provide first analyzed data. The at least one ML clustering algorithm determines abnormal behaviors of the first Internet-connected device and/or malicious communications to the first Internet-connected device. The at least one ML clustering algorithm determines at least one malware signature and/or at least one malicious IP address received by the first Internet-connected device.

In one aspect, the at least one ML clustering algorithm includes at least one Naïve Bayes classifier filter. In one aspect, the at least one ML clustering algorithm includes at least one unsupervised ML algorithm that mimics biological behavior to determine abnormal behaviors of the first Internet-connected device and/or malicious communications to the first Internet-connected device. In one aspect, the first management server implements a security analytics framework to collect the copy of the first device data. The security analytics framework is Apache Metron.

In one aspect, the management system further comprises a second management server communicatively coupled to the first management server and to at least one additional management server. The at least one additional management server is communicatively coupled to the Internet to: transmit, via the Internet, third blockchain information for recording on the first blockchain or a second blockchain, wherein the third blockchain information includes third control information to control at least a second Internet-connected device constituting a second embedded system with at least one dedicated function; and receive a copy of second device data for the second Internet-connected device; The at least one additional server analyzes the copy of the second device data using at least one second machine learning (ML) clustering algorithm to provide second analyzed data; The second management server: receives the first analyzed data from the first management server and the second analyzed data from the at least one additional management server; and further analyzes the first analyzed data and the second analyzed data using at least one third machine learning (ML) clustering algorithm to determine at least one of the first control information for the first Internet-connected device and the third control information for the second Internet-connected device.

In one aspect, the management system further comprises a second management server communicatively coupled to the first management server and to at least one additional management server, wherein: the at least one additional management server: is communicatively coupled to the Internet to: transmit, via the Internet, third blockchain information for recording on the first blockchain or a second blockchain wherein the third blockchain information includes third control information to control at least a second Internet-connected device constituting a second embedded system with at least one dedicated function; and receive a copy of second device data for the second Internet-connected device; and the at least one additional server analyzes the copy of the second device data using at least one second machine learning (ML) clustering algorithm to provide second analyzed data; and the second management server: receives the first analyzed data from the first management server and the second analyzed data from the at least one additional management server; and further analyzes the first analyzed data and the second analyzed data using at least one third machine learning (ML) clustering algorithm to determine at least one of the first control information for the first Internet-connected device and the third control information for the second Internet-connected device.

In one implementation, an Internet-connected device comprises: a memory storing an operating system, dedicated function firmware, and device management firmware; a processor coupled to the memory to execute the dedicated function firmware and the device management firmware via the operating system, wherein upon execution of the dedicated function firmware, the processor controls the Internet-connected device to perform at least one dedicated function; and a communication interface, communicatively coupled to the processor and the Internet, to facilitate Internet communications between the Internet-connected device and the Internet, wherein upon execution of the device management firmware, the processor of the Internet-connected device: controls the communication interface to receive, via the Internet, blockchain information relating to a first blockchain, wherein the blockchain information includes control information for the first Internet-connected device; and implements at least one first device management process to control the Internet-connected device based at least in part on the received control information.

In one aspect, the control information, included in the blockchain information and for the Internet-connected device, includes at least one security update for the Internet-connected device. The at least one device management process performed by the Internet-connected device includes at least one device security process. Upon execution of the device management firmware, the processor of the Internet-connected device: controls the communication interface to receive, via the Internet, the at least one security update for the Internet-connected device included in the blockchain information; and implements the at least one device security process to control the Internet-connected device based at least in part on the received at least one security update.

In one aspect, the control information, included in the blockchain information and for the Internet-connected device, includes at least one of: at least one whitelisted IP address from which the Internet-connected device accepts the Internet communications from the Internet, and at least one blacklisted IP address from which the Internet-connected device does not accept the Internet communications from the Internet. Upon execution of the device management firmware, the processor of the Internet-connected device: controls the communication interface to accept the Internet communication from the Internet based on the at least one whitelisted IP address, and/or not accept the Internet communications from the Internet based on the at least one blacklisted IP address.

In one aspect, the memory of the Internet-connected device further stores at least one command file with at least some of the control information; and the control information, included in the blockchain information and for the Internet-connected device, includes at least one of: an add command to add a whitelisted IP address or a blacklisted IP address to the at least one command file, a delete command to delete a whitelisted IP address or a blacklisted IP address from the at least one command file, a whitelisted process that is permitted to be executed as part of execution by the processor of the dedicated function firmware, and a regular expression string corresponding to a malware signature.

In one aspect, the communication interface of the first Internet-connected device includes a plurality of ports having respective port identifiers; and the control information, included in the blockchain information and for the Internet-connected device, includes at least one port identifier of at least one port of the plurality of ports for which communications between the Internet-connected device and the Internet are blocked.

In one aspect, the communication interface of the first Internet-connected device includes a plurality of ports having respective port identifiers; and the control information, included in the blockchain information and for the Internet-connected device, includes at least one of: at least one port identifier of at least one port of the plurality of ports for which communications between the Internet-connected device and the Internet are blocked, at least one whitelisted IP address from which the Internet-connected device accepts the Internet communications from the Internet, at least one blacklisted IP address from which the Internet-connected device does not accept the Internet communications from the Internet, an add command to add the at least one whitelisted IP address or the at least one blacklisted IP address to at least one command file stored in the memory, a delete command to delete the at least one whitelisted IP address or the at least one blacklisted IP address from the at least one command file, a whitelisted process that is permitted to be executed as part of execution by the processor of the dedicated function firmware, and a regular expression string corresponding to a malware signature.

In one aspect, the operating system of the Internet-connected device is a Linux-based operating system. In one aspect, a memory size of the device management firmware stored in the memory is less than or equal to 300 kilobytes (KB). In one aspect, a memory size of the device management firmware stored in the memory is between approximately 300 KB and 1.5 megabytes (MB). In one aspect, the operating system of the Internet-connected device includes a kernel, and the device management firmware and the kernel of the operating system have a same privilege level. In one aspect, the memory of the Internet-connected device includes a filesystem; and the device management firmware is stored in a hidden folder of the filesystem and/or as a hidden file in the filesystem.

In one aspect, the Internet-connected device includes at least one of: a sensor, a meter, a regulator, an actuator, a scanner, an image or video acquisition device, a biometric reader, and a card reader. In one aspect, the Internet-connected device includes one of: a medical device, a camera, a smart home device, a closed circuit TV/security device, a portable media player, an electronic bracelet, a smart watch, an electric utility device, a water network device, a transportation system device, an oil refinery device, a chemical/manufacturing plant device, an assembly line device, and a mining operation device.

In one aspect, the device management firmware includes a plurality of known malware signatures; upon execution of the device management firmware including the plurality of known malware signatures, the processor of the Internet-connected device implements a malware scan and remove process based at least in part on the plurality of known malware signatures.

In one aspect, upon execution of the device management firmware, the processor of the Internet-connected device: scans the memory during the execution of the dedicated function firmware to determine at least one permissioned process that facilitates performance of the at least one dedicated function; generates a process whitelist including an identifier for each permissioned process of the at least one permissioned process; and stores the process whitelist in the memory of the Internet-connected device.

In one aspect, upon execution of the device management firmware after generation of the process whitelist, the processor of the Internet-connected device: scans the memory during the execution of the dedicated function firmware to detect at least one unpermissioned process based on the process whitelist; and kills the at least one unpermissioned process if detected.

In one aspect, the control information, included in the blockchain information and for the Internet-connected device, includes at least one blacklisted IP address from which the Internet-connected device does not accept the Internet communications from the Internet; and upon execution of the device management firmware, the processor of the Internet-connected device controls the communication interface to block incoming Internet communications having the at least one blacklisted IP address.

In one aspect, the blockchain information relating to the first blockchain includes first transaction data messages relating to first transactions from a first blockchain node to a second blockchain node; the first transaction data messages include the control information and a second address for the second blockchain node; and upon execution of the device management firmware, the processor of the Internet-connected device: controls the communication interface to receive, via the Internet, transaction information relating to the first transaction data messages based at least in part on the second address for the second blockchain node.

In one aspect, the first blockchain is the bitcoin blockchain; the control information for the Internet-connected device is included in a line of the first transaction data messages using the bitcoin OP_RETURN opcode; upon execution of the device management firmware, the processor of the Internet-connected device parses the transaction information to access the control information included in the line of the first transaction data messages using the bitcoin OP_RETURN opcode.

In one aspect, upon execution of the device management firmware, the processor of the Internet-connected device controls the communication interface to: transmit first queries via the Internet to a plurality of blockchain explorer websites; and retrieve at least some of the control information from respective websites of the plurality of websites, based at least in part on the second address in the first transaction data messages.

In one aspect, the first transactions include a first one of the first transactions; a first item of the control information for the Internet-connected device is included in a first one transaction data message representing the first one of the first transactions, using the bitcoin OP_RETURN opcode; the first one transaction data message includes the second address; the first one transaction data message is transmitted by the first blockchain node for recording on the first blockchain; the at least three of the respective websites of the plurality of websites provide access to the first one transaction data message; and upon execution of the device management firmware, the processor of the Internet-connected device: controls the communication interface to retrieve, via the Internet, the first one transaction data message from the at least three of the respective websites of the plurality of websites, based at least in part on the second address in the first transaction data message; and implements the at least one device management process to control the Internet-connected device based at least in part on the first item of the first control information in the first data transaction message when a majority of the at least three of the respective websites provide access to identical versions of the first one transaction data message.

In one aspect, a memory size of the device management firmware stored in the memory is less than or equal to 300 kilobytes (KB). In one aspect, the device management firmware of the Internet-connected device includes a Simplified Payment Verification (SPV) bitcoin wallet. In one aspect, the first transaction data messages are stored in a plurality of blocks of the first bitcoin blockchain; each block of the plurality of blocks includes a block header; and upon execution of the device management firmware including the SPV bitcoin wallet, the processor of the Internet-connected device: controls the communication interface to retrieve via the Internet, from at least one full bitcoin node, a plurality of block headers of at least some of the plurality of blocks; controls the communication interface to send a query, via the Internet, to the at least one full bitcoin node, for at least some of the first transaction data messages, based at least in part on the second address; verifies that the at least some of the first transaction data messages are recorded in the first bitcoin blockchain, based on at least some block headers of the plurality of block headers; and implements the at least one device management process to control the Internet-connected device based at least in part on the control information in the verified at least some of the first transaction data messages.

In one aspect, upon execution of the device management firmware including the SPV bitcoin wallet, the processor of the Internet-connected device: controls the communication interface to retrieve via the Internet, from the at least one full bitcoin node, the plurality of block headers of a certain range of the plurality of blocks of the first bitcoin blockchain, based at least in part on timestamps of respective blocks of the plurality of blocks.

In one aspect, upon execution of the device management firmware, the processor of the Internet-connected device: controls the communication interface to transmit first device data from the Internet-connected device to a plurality of rendezvous servers. In one aspect, the first device data includes network traffic data relating to Internet communications received and/or transmitted by the communication interface of the Internet-connected device.

In one aspect, the device management firmware of the Internet-connected device includes a packet sniffer; and upon execution by the processor of the Internet-connected device of the device management firmware including the packet sniffer, the processor: intercepts and analyzes IP packets of the Internet communications received by the communication interface of the Internet-connected device; generates an IP packet log based at least on respective headers of the intercepted and analyzed IP packets; stores the IP packet log in the memory of the Internet-connected device; and controls the communication interface of the Internet-connected device to transmit the IP packet log as the network traffic data from the Internet-connected device to the plurality of rendezvous servers.

In one aspect, the device management firmware of the Internet-connected device further includes respective IP addresses for the plurality of rendezvous servers; and upon execution by the processor of the Internet-connected device of the device management firmware, the processor controls the communication interface of the Internet-connected device to transmit the IP packet log as the network traffic data from the Internet-connected device to the plurality of rendezvous servers based at least in part on the respective IP addresses. In one aspect, upon execution by the processor of the Internet-connected device of the device management firmware, the processor controls the communication interface to transmit the first device data from the Internet-connected device to the plurality of rendezvous servers using a Diffie-Hellman encryption protocol based on a public-private key pair.

In one aspect, the public-private key pair used by the Internet-connected device to transmit the first device data to each rendezvous server is periodically changed. In one aspect, the plurality of rendezvous servers includes at least three rendezvous servers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
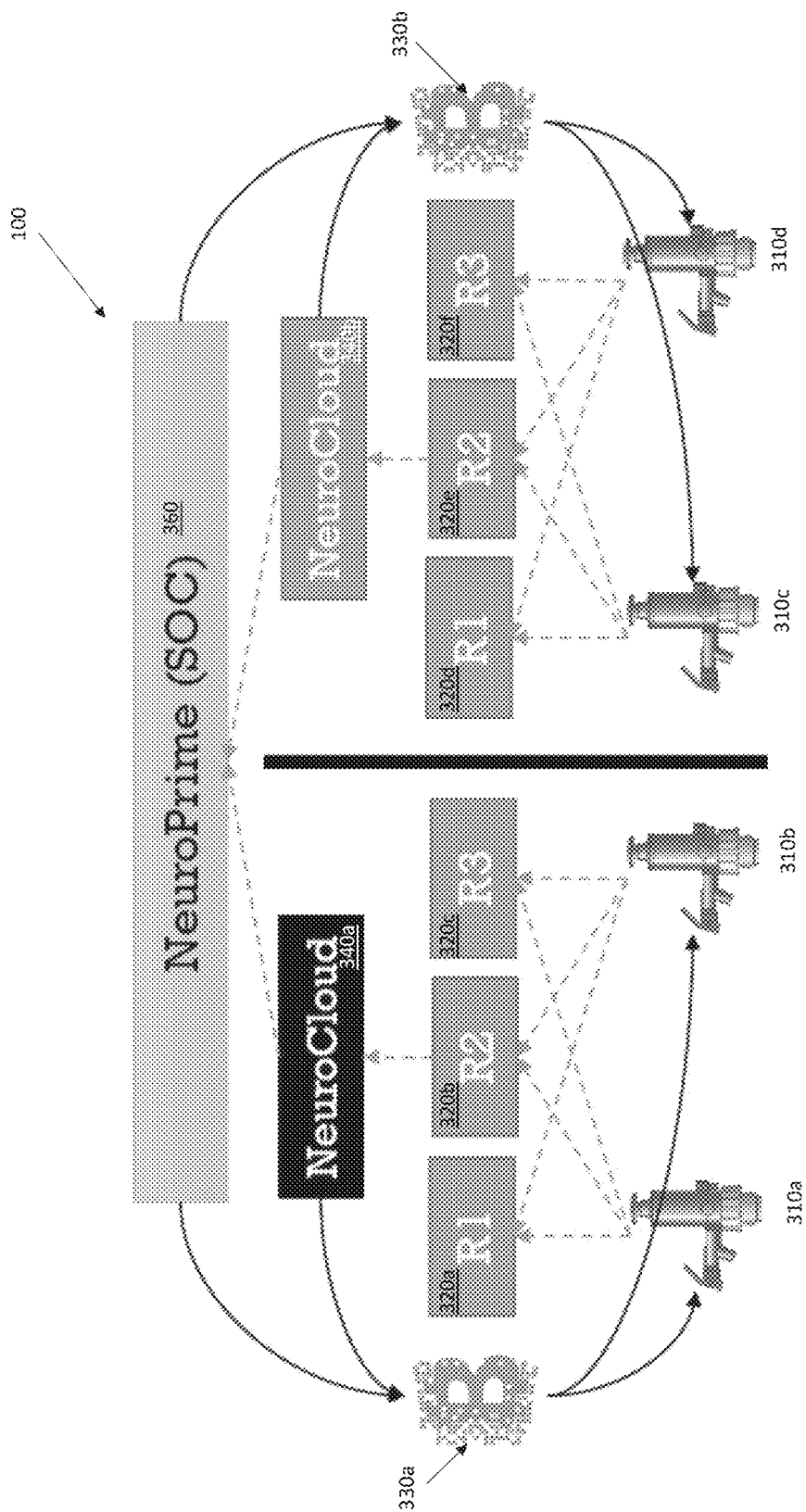
FIG. 1 illustrates a schematic representation of a system for controlling internet-coupled device nodes in accordance with some aspects.

The present disclosure describes concepts related to, and implementations of, methods, apparatus, and systems for controlling internet-connected devices having embedded systems with dedicated functions.

Glossary

EMBEDDED SYSTEM: a computer system with a dedicated function that is included in a mechanical and/or an electrical system/device.

BLOCKCHAIN: a distributed database used to maintain a continuously growing list of records, called blocks. A blockchain is typically managed by a peer-to-peer network collectively adhering to a protocol for validating new blocks. Once data on a blockchain is recorded, the data in any given block cannot be altered retroactively without the alteration of all subsequent blocks and a collusion of the network majority. Some non-limiting examples of blockchain include public trustless distributed ledger, bitcoin blockchain, Ethereum blockchain, private blockchain, a combination thereof, and/or the like.

INTERNET-COUPLED DEVICE NODE (also referred to herein as "IoT device," "endpoint," "IoT endpoint," and/or "device node"): a physical device that is enabled to connect to a network, such as the Internet, Local Area Network (LAN), Wide Area Network (WAN), WiFi, LoRa, and/or the like. In some implementations, internet-coupled device nodes can constitute embedded systems with a dedicated function.

IOT: a network of internet-coupled device nodes.

DEDICATED FUNCTION FIRMWARE (also referred to herein as "firmware"): computer software included in embedded systems and/or internet-coupled device nodes. The embedded systems and/or internet-coupled device nodes can be controlled to perform at least one dedicated function upon execution of the dedicated function firmware. In some implementations, the dedicated function firmware can provide an operating environment for a part of the internet-coupled device node's software. In some implementations, the dedicated function firmware can act as the internet-coupled device node's complete operating system.

DEDICATED MANAGEMENT FIRMWARE (also referred to herein as "NeuroNode"): computer software that can be injected and/or installed into an internet-coupled device node and/or an embedded system to control, secure, protect, and/or safeguard the internet-coupled device. In one aspect, the dedicated management firmware can protect the internet-coupled device node from a security breach and can provide secure malware protection to the internet-coupled device node. The dedicated management firmware can function in tandem with the dedicated function firmware and can be communicably coupled to the dedicated function firmware.

BLOCKCHAIN WALLET: a software (digital wallet) including a collection of private keys configured to manage those private keys and to make transactions on a blockchain network.

NEUROCLOUD (also referred to herein as "a first management server"): a command and control server that can post control information for internet-coupled device nodes as described herein. In one implementation, the NeuroCloud can include at least two blockchain wallets to transmit control information as described herein.

RENDEZVOUS SERVERS (also referred to herein as "rendezvous points"): servers (e.g., a series of instances of Amazon Web Services™ servers) that can act as a staging area for data transmitted from the NeuroNode to the NeuroCloud in a manner described herein.

NEUROPRIME (also referred to herein as "a second management server"): a central server to control and monitor multiple NeuroClouds, rendezvous servers, and NeuroNodes.

BLOCKCHAIN EXPLORER WEBSITES: online blockchain browsers that display contents of individual blocks and transactions as well as transaction histories and balances of addresses (e.g., coin based transactions).

Technological Solutions to Improve IoT Functionality, Enhance IoT Security, Control IoT Devices, and Protect IoT Devices from Security Breaches In developing methods, apparatus, and systems disclosed herein, including the NeuroNode, rendezvous servers, NeuroCloud, and NeuroPrime as shown in FIG. 1, the Inventors recognized and appreciated multiple technological problems with conventional techniques for safeguarding IoT and IoT devices from security breaches. First, the Inventors recognized the reasons that made IoT and IoT devices a target for hackers. These include—

Conventional Techniques do not have Security Protocols for Light-Weight Devices

IoT devices in general are light-weight with low-powered processors and small memory capacities. Specifically, most IoT devices run on various distributions of Linux-based operating systems. Linux-based operating systems have a stable kernel and can read, modify, and redistribute source code. For example, OpenWrt that is primarily used in IoT devices such as routers and gateways, provide the IoT devices with fully editable file system and package management. This gives the IoT devices the freedom to customize the IoT devices through the use of these packages to suit any application. Similarly, DD-WRT that is used on wireless routers and access points include a web user interface that allows for quick and easy configuration in addition to the file system and package management. However, Linux-based operating systems often leave a relatively small memory footprint. Small memory footprint and small processing capabilities make usage of conventional anti-viruses in IoT devices impossible.

Conventional Techniques are not Configured to Handle Security Breaches Due to Open Ports Routers and switches provide infrastructure to connect to the Internet. However, typical routers are not configured to scan and analyze network traffic. In addition, most routers have Universal Plug-in-Play (UPnP) protocol that allow IoT devices to automatically open ports to transfer data (e.g., in Smart TVs, gaming consoles, and other devices). Many routers also use open-source firmware with hardcoded default username and passwords. Furthermore, routers are always-on and are connected to the Internet. Therefore, routers form a prime target for hackers. Hackers have in the past broken into routers and installed malware to launch DDoS attacks. The open ports to transfer data can make it easy for hackers to intrude into an IoT device.

Conventional Security Standards for IoT is Severely Lacking

Some existing security standards for IoT includes using certificates that are security protocols that can offer identity management to these IoT devices. Specifically, conventional techniques use public/private key certificates and digital signatures to verify the identity of devices. However, this technique is highly susceptible to man-in-the-middle attack. Put differently, the private key certificates are often sent over the Internet, creating the risk of being exploited and/or being intercepted by an attacker. Some conventional techniques also include using randomly generated administrative passwords. However, these passwords are often vulnerable to brute-force attacks granting an attacker admin level IoT device access. Most IoT devices also include firmware to control the IoT devices. However, firmware are often susceptible to code exploits and to malicious applications that allow intruders to access the IoT devices to install botnets and ransomware on the IoT devices. In addition, any update to existing firmware requires taking the firmware offline thereby stalling the operation of the IoT device. Any impact to firmware may impact the operating system on the IoT device thereby impacting operations of the IoT device itself.

The Inventors have addressed these technological problems involving security of IoT and IoT devices with solutions and technical features described herein.

FIG. 1, illustrates an example implementation of a system 100 for controlling internet-coupled device nodes ("device nodes") 310. As shown in FIG. 1, system 100 can control one or more device nodes, for example, device nodes 310a-310d (collectively, device nodes 310). These device nodes 310 can include one or more NeuroNodes (not shown). Each of these device nodes 310 are communicably coupled with one or more rendezvous servers 320. For example, in FIG. 1, device nodes 310a and 310b are communicably coupled with rendezvous servers 320a-320c. In a similar manner, device nodes 310c and 310d are communicably coupled with rendezvous servers 320d-320f. The rendezvous servers 320 are communicably coupled with a NeuroCloud 340, such as NeuroCloud 340a and 340b (collectively, NeuroCloud 340). For example, in FIG. 1, rendezvous servers 320a-320c are communicably coupled with NeuroCloud 340a and rendezvous servers 320d-320f are communicably coupled with NeuroCloud 340b.

Each NeuroCloud 340 can act as a command and control server ("management server") for at least a set of device nodes 310. For example, in FIG. 1, NeuroCloud 340a acts as a management server for device nodes 310a and 310b. In a similar manner, NeuroCloud 340b acts as a management server for device nodes 310c and 310d. NeuroClouds 340 can post control information for the set of device nodes 310 that they control via a blockchain 330. For instance, in FIG. 1, NeuroCloud 340a posts control information for device nodes 310a and 310b via blockchain 330a. In a similar manner, NeuroCloud 340b posts control information for device nodes 310c and 310d via blockchain 330b.

A NeuroPrime, such as NeuroPrime 360 can act as a supreme control server and can be configured to manage and control each of the NeuroClouds 340, rendezvous servers 320, blockchains 330, and device nodes 340. In one implementation, a single NeuroCloud 340 and the rendezvous servers 320, the device nodes 310, and blockchain 330 that the NeuroCloud 340 controls can form a mesh network. For instance, in FIG. 1 NeuroCloud 340a, rendezvous servers 320a-320c, device nodes 310a and 310b, and blockchain 330a can form a first mesh network. In a similar manner, NeuroCloud 340b, rendezvous servers 320d-320f, device nodes 310c and 310d, and blockchain 330b can form a second mesh network. In such an implementation, the NeuroPrime 360 controls each of the mesh networks (e.g., first mesh network and second mesh network in FIG. 1).

It should be appreciated that the specific number of NeuroClouds 340, rendezvous server 320, and device nodes 310 shown in FIG. 1 are for illustrative purposes only. In reality, system 100 can include any number of NeuroClouds 340, rendezvous servers 320, device nodes 310, and a combination thereof.

Device Nodes

Device nodes 310 are physical devices that can connect to a network, such as the Internet, Local Area Network (LAN), Wide Area Network (WAN), and/or the like. In some implementations, device nodes 310 can include at least one of a sensor, a meter, a regulator, an actuator, a scanner, an image or video acquisition device, a biometric reader, a card reader, a combination thereof, and/or the like. Some non-limiting examples of device nodes 310 include camera, smart home device, closed circuit TV, security device, portable media player, electronic bracelet, smart watch, electro utility device, water network device, transportation system device, oil refinery device, chemical/manufacturing plant device, assembly line device, mining operation device, a combination thereof, and/or the like.

Figure 2:
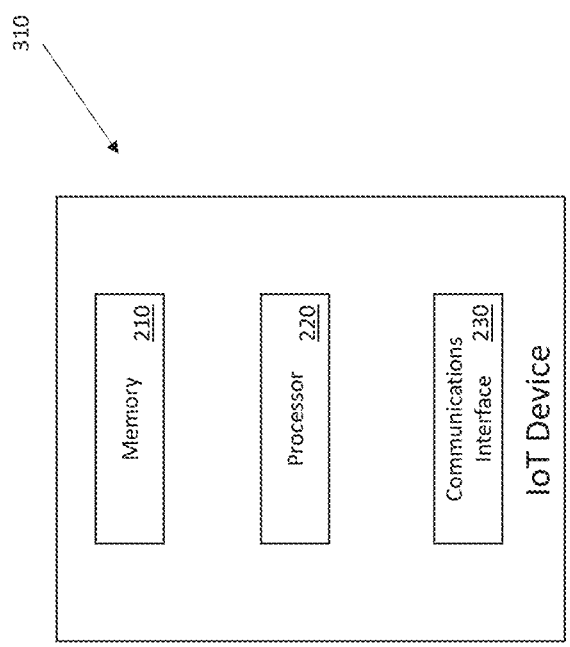
FIG. 2 is a schematic illustration of an example device node according to various aspects described herein.

In some implementations, device nodes 310 can constitute embedded systems with a dedicated function. FIG. 2 is a schematic illustration of an example device node 310 according to various aspects described herein. Device node 310 can include a memory 210, a processor 220 coupled to the memory 210, and a communications interface 230 coupled to the processor 220 and a network (e.g., Internet) (not shown in FIG. 2).

Memory 210 can include any suitable form of memory, such as cache memory, semi-permanent memory (e.g., RAM), or any other memory type, or combinations thereof. In one implementation, memory 210 can be used in place of an external memory and/or storage unit for storing data on device node 310. In another implementation, memory 210 can be used in addition to an external memory and/or storage unit for storing data on device node 310. In some implementations, memory 210 is the only memory and/or storage unit for storing data on device node 310.

In some aspects, memory 210 can store an operating system for the device node 310, a firmware, and a NeuroNode. In one implementation, the operating system of the device node 310 is a Linux-based operating system. The processor 220 can execute the firmware and the NeuroNode via the operating system. By executing the firmware, the processor 220 can control the device node 310 to perform one or more dedicated functions. By executing the NeuroNode, the processor can control the communications interface 230 to receive control information for the device node 310. The control information can be received via the network (not show in FIG. 2). For example, the processor 220 can control the communications interface 230 to receive a command and/or a parameter to control the device node 310. In some aspects, the command and/or parameter are included in a blockchain transaction. The processor 220 can then control the device node 310 based on the control information (e.g., command and/or parameter). In some aspects, the communications interface 230 of the device node 310 includes multiple ports each associated with a respective port identifier.

NeuroNodes

Figures 3A, 3B:
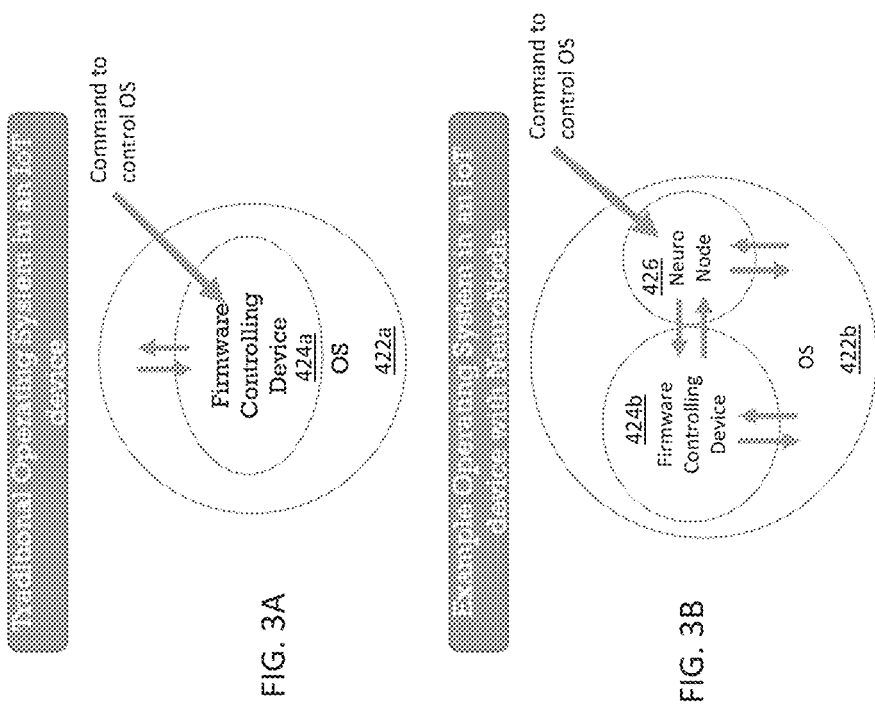
FIG. 3A illustrates a conventional and/or traditional operating system in device node.
FIG. 3B illustrates an example operating system that includes features to control the device node without impacting the operations of the device node in accordance with some aspects.

FIG. 3A illustrates a conventional and/or traditional operating system 422a in device node 310. Traditional operating system 422a includes firmware 424a to control the device node 310. Changes to the operating system 422a are made by sending a command through the firmware 424a. The firmware 424a then controls the device node 310 impacting the operation of the device node 310. However, firmware 424a are often susceptible to code exploits and to malicious applications. In addition, any update to firmware 424a in order to update control information for device node 310, would require the firmware 424a to be taken offline thereby stalling the operation of the device node 310.

FIG. 3B illustrates an example operating system 422b that includes features to control the device node 310 without impacting the operations of the device node 310. In one implementation, operating system 422b includes firmware 424b and a NeuroNode 426. A NeuroNode 426 is a computer software that can be installed and/or injected into the device node 310 to provide secure malware protection to the device node 310. In some implementations, a manufacturer could provide the NeuroNode 426 at the time of installation of the device node 310. In some implementations, NeuroNode 426 can be installed after the installation of the device node 310. In some implementations, NeuroNode 426 can be installed even after the device node 310 is already in operation.

In one aspect, NeuroNode 426 can be installed using a Secure Shell (SSH) protocol. In one aspect, SSH mechanism can be applied to retrieve the NeuroNode 426 via the Internet from one or more file hosting services such as Dropbox™, Github™, cloud servers (e.g., Amazon™ web servers), and/or the like.

In one aspect, the NeuroNode 426 can be designed to imitate a malware and can be installed in a device node 310 using Internet Protocol (IP) propagation. For example, the NeuroNode 426 can find device nodes 310 within a given IP range (e.g., by pinging devices within an IP range). The NeuroNode can then access the identified device node 310 by using authentication password for the identified device node 310. These authentication passwords can be provided to the NeuroNode 426 by a manufacturer of the device node 310. In such an implementation, the NeuroNode 426 can be installed without disconnecting the device node 310 from the network and/or taking the device node 310 offline.

In one aspect, the NeuroNode 426 can be embedded as a software update to the firmware 424b. When the device node 310 reboots following the firmware 424b update, the NeuroNode is installed on the device node 310.

In one implementation, the NeuroNode 426 can have the same privilege level of the kernel of the operating system of the device node 310. In one implementation, the memory (e.g., memory 210 in FIG. 2) of the device node 310 can include a filesystem. The NeuroNode 426 can be stored in a hidden folder of the filesystem and/or as a hidden file in the filesystem.

In one aspect, the NeuroNode 426 can be configured to run in tandem with the firmware 424b and can communicate with the firmware 424b. Therefore, control information can be provided to the NeuroNode 426 instead of firmware 424b. Consequently, the firmware 424b need not be taken offline and can continue to run as normal. Put differently, control information can be transmitted to the NeuroNode 426 as the firmware 424b continues to run thereby not stalling and/or hindering the operation of device node 310. Therefore, the NeuroNode 426 can manage and control the operating system 422b and hence the device node 310 itself thus providing a novel and unique method to manage and control device nodes.

Example Functionalities of the NeuroNode

To begin with, the NeuroNode 426 can include an initial set of malware signatures that can be hardcoded into the NeuroNode 426. Once the NeuroNode 426 is installed, a function referred to herein as "malware killer" included in the NeuroNode, scans all the processes that are running on the device node 310. The malware killer compares the processes that are running on the device node 310 to the initial set of malware signatures. Based on this comparison, the malware killer identifies malware signatures that are potentially hazardous to the device node 310 and kills the appropriate processes associated with these identified signatures. Once the unsanctioned processes are killed, the NeuroNode 426 creates a list of sanctioned processes (also referred to herein as "whitelisted processes") and creates a "system monitor" for the device node 310. Any changes to the list of sanctioned processes can only be made by dual factor authentication as described herein.

The system monitor constantly monitors all the processes running on the device node 310. The system monitor includes the list of sanctioned processes. When the device node 310 attempts to run a process that is not included in the list of sanctioned processes, the NeuroNode 426 kills such a process by using one or more commands referred to herein as "sigkill commands."

In addition to the list of sanctioned processes, the system monitor also creates a list of whitelisted IP addresses and/or a list of blacklisted IP addresses. These whitelisted IP addresses and/or blacklisted IP addresses are updated and/or obtained from the NeuroCloud (e.g., NeuroCloud 340 in FIG. 1) as control information. A function in the NeuroNode 426 referred to herein as "IP filter" blocks IP addresses that are blacklisted. In some implementations, the system monitor is configured to create either a list of blacklisted IP addresses or a list of whitelisted IP addresses based on the computing power of the device node 310. For instance, for device nodes 310 with low computing power, the system monitor can include a list of whitelisted IP addresses. For device nodes with higher computing power, the system monitor can include a list of blacklisted IP addresses.

In some aspects, the NeuroNode 426 can include a function, referred to herein as "packet sniffer" to intercept and analyze IP packets of Internet communications that are obtained by the communications interface (e.g., communications interface 230 in FIG. 2) of the device node 310. In some aspects, the NeuroNode 426 analyzes communication between a first device node (e.g., device node 310a in FIG. 1) and one or more of the other device nodes (e.g., device node 320b in FIG. 1). The NeuroNode 426 can then generate an IP packet log based on the respective headers of the intercepted and analyzed IP packets. This packet log can be stored in the memory (e.g., memory 210 in FIG. 2) of the device nodes 310. The NeuroNode 426 can then transmit the IP packet log to the rendezvous servers 320 via the communications interface (e.g., communications interface 230 in FIG. 2) of the device node 310.

In one aspect, NeuroNode 426 can have a memory size that is less than or equal to 300 kilobytes (KB). Such NeuroNodes 426 are referred to herein as "NeuroNodes without SPV." In another aspect, the memory size of the NeuroNode 426 can be approximately between 300 KB to 1.5 megabytes (MB). Such NeuroNodes 426 are referred to herein as "NeuroNodes with SPV." The memory size of the NeuroNode can depend on the type of device node 310.

Rendezvous Server

In some implementations, rendezvous servers (for example, rendezvous server 320 in FIG. 1) (also referred to as "rendezvous points" herein) are a series of instances of Amazon Web Services™ servers. Information from the NeuroNodes 426 are transmitted to the NeuroCloud 340 via rendezvous points 320.

Upstream Communication (NeuroNode-Rendezvous Servers-NeuroCloud)

Information (for example, IP traffic data and/or IP packet log) can be relayed from the NeuroNode 426 to the rendezvous points 320 and from the rendezvous points 320 to the NeuroCloud 340. In one aspect, packets of Network traffic data are communicated from the NeuroNode 426 to the rendezvous points 320 using Diffie-Hellman key exchange. Diffie-Hellman exchange enables lightweight and secure transfer of information. Put differently, in some aspects, a secret key can be associated with every rendezvous point 320. These secret keys in Diffie-Hellman exchange can be visible only to elements and/or devices within a mesh network. For example, secret keys associated with rendezvous points 320a-320c in FIG. 1, can be visible only to device nodes 310a and 310b, NeuroCloud 340a, and blockchain 330a. In a similar manner, secret keys associated with rendezvous points 320d-320f in FIG. 1, can be visible only to device nodes 310c and 310d, NeuroCloud 340b, and blockchain 330b. The fact that these secret keys are visible only to elements within the mesh network, can prevent any man in the middle attack from a node and/or actor outside of the mesh network. Diffie-Hellman exchange also enables Perfect Forward Secrecy (PFS). That is, the secret key associated with the rendezvous points 320 are continuously changed. In some aspects, the secret keys can be changed every 90 seconds.

Each NeuroNode 426 can send the same information (e.g., packets of Network traffic data) to multiple rendezvous points 320. For example, in FIG. 1, the NeuroNode (not shown) in device node 310*a* can send the same packet of Network traffic data to rendezvous points 320*a*, 320*b*, and 320*c*. In some implementations, each NeuroNode 426 transmits information to three rendezvous points 320.

In some aspects, communication from NeuroNode 426 to the rendezvous points 320 can be enabled by implementing a client-side (lightweight) code and a server-side (heavyweight) code. In one aspect, NeuroNode 426 executes the client-side code and the rendezvous point 320 executes the server-side node to enable communication from the NeuroNode 426 to the rendezvous point 320. At a given point in time, the NeuroNode 426 communicates with a single rendezvous point 320 (although the NeuroNode 426 sends the same information to multiple rendezvous points 320). However, at a given point in time, each rendezvous point 320 can be in communication simultaneously with multiple NeuroNodes 426.

Therefore, the client-side code is implemented such that the client-side code is called the same number of times as the number of rendezvous points 320 that the NeuroNode 426 is configured to send information (e.g., same network traffic packet) to. For example, if a NeuroNode 426 is configured to send information to three rendezvous points 320, then the client-side code is implemented three times. However, each time the client-side code is called, it includes the respective IP address of the rendezvous point 320 that the NeuroNode 426 is communicating with at that given time. For the example described above, the client-side code is called three times and each of the three times the client-side code includes the IP address of the respective rendezvous point (one of the three rendezvous points) that the NeuroNode is communicating with. The server-side code however, need not include information of the IP address of the NeuroNodes 426. Instead, the server-side code includes authentication techniques (e.g., a handshake) to verify that the rendezvous point 320 is communicating with a NeuroNode 426. In some aspects, a log file is executed to keep track of all communications between the client (e.g., NeuroNodes) and server (e.g., rendezvous points).

As discussed above, information such as Network traffic files including IP traffic data is relayed from a NeuroNode 426 to the rendezvous points 320. A hashmap of these files (e.g, hashmap of IP traffic files) are then transmitted from the rendezvous points 320 to the NeuroCloud 340 using Diffie-Hellman exchange.

In some aspects, a similar client-side and server-side code for communication from NeuroNode 426 to rendezvous point 320 is implemented to also enable communication from rendezvous point 320 to the NeuroCloud 340. For this portion of communication, the rendezvous point 320 executes the client-side code and the NeuroCloud 340 executes the server-side code to enable communication from the rendezvous point 320 to the NeuroCloud 340. In one implementation, the client-side code that is used for communication between the NeuroNode 426 and the rendezvous server 320 is slightly modified to enable communication from the rendezvous server 320 to the NeuroCloud 340. In particular, since the rendezvous point 320 communicates with only one NeuroCloud 340, the IP address of the NeuroCloud 340 can be hardcoded in the .config file and executed on a rendezvous point 320 (in contrast to calling the client-code multiple times).

Once the NeuroCloud 340 obtains hashmaps of Network traffic data from a rendezvous point 320, the NeuroCloud 340 sends an acknowledgement to that rendezvous point 320. When the NeuroCloud 340 obtains the hashmaps of Network traffic data from each rendezvous point 320, the NeuroCloud 340 implements a consensus algorithm to determine the truth. If the consensus algorithm results in hashes from each rendezvous point 320 being equal, the NeuroCloud 340 requests the underlying Network traffic data from one of the rendezvous points 320 and sends a command to each of the rendezvous points 320 to delete this underlying data. Therefore, the true data is stored on the NeuroCloud 340. If the consensus algorithm results in hashes from a majority of rendezvous points 320 being equal, the NeuroCloud 340 requests the underlying Network traffic data from one of the majority of rendezvous point 320 and sends a command to each of the rendezvous points 320 to delete the underlying data. If the consensus algorithm results in hashes from all of the rendezvous points 320 being different, the NeuroCloud 340 disregards the dataset associated with that hashmap and instructs all the rendezvous points 320 to delete the underlying Network traffic data. In this manner, true data is stored on the NeuroCloud 340. If the same rendezvous point 320 recurrently transmits bad feeds, the rendezvous point 320 is considered compromised.

In some aspects, the NeuroCloud 340 obtains the hashmaps of the Network traffic data and/or the undelying data by implementing a security analytics framework (e.g., Apache Metron).

NeuroCloud

Figure 4:
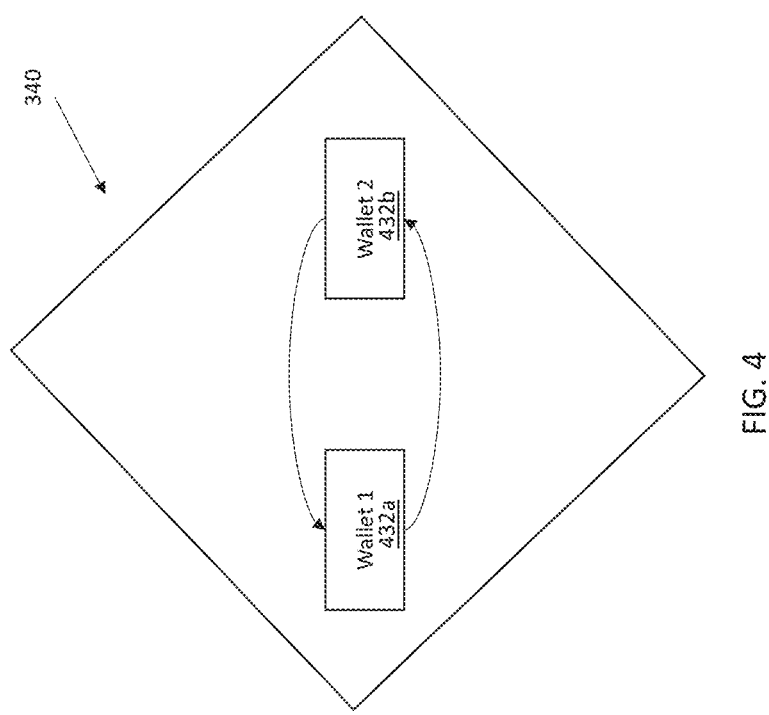
FIG. 4 is a schematic illustration of a NeuroCloud in accordance with some implementations described herein.

FIG. 4 is a schematic illustration of a NeuroCloud 340 in accordance with some implementations described herein. In one implementation, NeuroCloud 340 is a management server with two blockchain client wallets, for example, 432*a* and 432*b* (collectively, blockchain wallets 432). In some aspects, the NeuroCloud can be an Amazon Web Service™ server.

In some aspects, the NeuroCloud 340 can host machine learning algorithms that analyze the Network traffic data (e.g., run consensus algorithm on hashed Network traffic data, determine and store single truth, analyze data stored as single truth, etc.). Some non-limiting examples of machine learning algorithms include clustering algorithms, Naïve Bayes classifier filter, unsupervised machine learning algorithms (e.g., algorithms that mimic biological behavior to determine abnormal behaviors). Control information for the device nodes 310 is generated based on this analysis. The blockchain wallets 432 can post transactions on the blockchain (e.g., blockchain 330*a* and 330*b* in FIG. 1) and include the control information within these transactions. In some aspects, control information can include security updates for one or more device nodes 310, a whitelisted IP address, a blacklisted IP address, whitelisted processes, port identifiers, and/or malware signatures.

In one instance, the blockchain wallets 432*a* and 432*b* communicate with each other regularly to transmit information using their respective wallet addresses. In some aspects, private key of the blockchain wallets 432 can be used to relay information from one blockchain wallet 432 to another within the NeuroCloud 340. However, private keys of these blockchain wallets 432 are not shared outside of the NeuroCloud 340. Therefore, these blockchain wallets 432 cannot be spoofed. Put differently, while nodes/bad actors outside of the NeuroCloud 340 may be able to read the communication between the blockchain wallets 432, nodes/bad actors outside of the NeuroCloud 340 will not be able to impersonate the blockchain wallets 432 and/or post transactions as the blockchain wallets 432 because they would not have access to these blockchain wallet's private keys.

Therefore, the control information included within the blockchain transactions in the NeuroCloud 340 are secure and cannot be hacked into or modified.

In some aspects, the transactions and communications to and from blockchain wallets 432 within the NeuroCloud 340 can be relayed in a manner similar to traditional blockchain wallets. Information is relayed from the NeuroCloud 340 to the NeuroNodes 426 (included in the device nodes 310) via the blockchain 330 thus providing control information (e.g., security updates) to the device nodes 310. In some aspects, control information can be included in transactions posted on the blockchain. In some aspects, a transaction can also include the wallet address of the blockchain wallet 432 to which the transaction is posted. If the NeuroNode 426 is a NeuroNode with SPV (i.e., includes a SPV wallet), the information from the NeuroCloud 340 is transmitted via the blockchain 330. If the NeuroNode 426 is a NeuroNode without SPV (i.e., does not include a SPV wallet), the control information from the NeuroCloud 340 is posted on a blockchain website as described in detail in sections below.

Blockchain

Relaying information via blockchain 330 guarantees secure transmission since the address of the blockchain wallets 432 cannot be spoofed. In addition, blockchain 330 enables scalability within the system 100. Put differently, control information, such as security updates from the NeuroCloud 340 can be sent to all NeuroNodes 426 communicating with that NeuroCloud 340. Hence, mass security updates to all the NeuroNodes 426 can be transmitted in a reliable and cheap manner. Further, any information relating to the device node 310 can be transmitted via blockchain 330. That is, the blockchain 330 can relay whitelisted IP addresses, blacklisted IP addresses, malware signature, and/or the like.

NeuroNodes without SPV—Obtaining Control Information from NeuroCloud

In some aspects, the NeuroNode 426 can have a memory size that is less than or equal to 300 KB depending on the type of device node 310. Such NeuroNodes 426 with low memory capacity do not include blockchain clients. The control information from the NeuroCloud 340 are posted as blockchain transactions. Since these NeuroNodes 426 with low memory capacity do not include a blockchain client, the control information is posted on relevant blockchain websites (also referred to herein as "blockchain explorer websites") such as blockchain.io, blocker.io, blockchain.info, OXT, blockcypher, insight, blocktrail, sochain, and/or the like.

In some aspects, a JSON API included in such NeuroNode 426 can be configured to obtain the JSON files including the blockchain transactions that are posted to these websites. The NeuroNode 426 determines transactions that are relevant to the NeuroCloud 340 based on the public address of one or more blockchain wallets 432 within the NeuroCloud 340. The JSON files of the transactions that are associated with the NeuroCloud 340 can be obtained via a JSON API. The transactions can be parsed using a third-party library (e.g., libcurl-dev for bitcoin transactions). Once the transactions are obtained they can be cached and then parsed. This process is repeated every 30 seconds. That is, relevant transactions are accessed and downloaded every 30 seconds.

In some aspects, the NeuroNode 426 can implement a consensus algorithm to determine the truth. For example, if there are three websites that include blockchain transactions then transactions that are present in at least two of the websites are considered to be the truth. In some aspects, the transactions can also be posted on a private Amazon Web Services™ database. In such aspects, if one of the other websites malfunction, the transaction posted on the private server can be considered more closer to the truth than the transactions on the other websites. The transactions determined as the truth are stored in a command file. For example, if an IP address 10.10.10 is posted on all the websites, the JSON API obtains the JSON file. The result is cached and parsed and following the implementation of consensus algorithm, the command "ADD 10.10.10" is added to the command file. This process is repeated every 30 seconds.

NeuroNodes with SPV—Obtaining Control Information from NeuroCloud

In some aspects, the NeuroNode 426 can have a memory size that is between 300 KB and 1.5 MB depending on the type of device node 310. Such NeuroNodes 426 can include a lightweight blockchain wallet based on Simplified Payment Verification (SPV).

Traditional SPV blockchain wallets store and relay the entire transaction. In order to make the NeuroNode 426 lightweight, the SPV wallets are modified to store only headers of the transactions instead of the entire transaction. In addition, these NeuroNodes 426 can be configured such that the SPV wallets store headers of only transactions that were posted following the installation and inception of the system 100 described herein. This is because transactions that are relevant to the security of the device nodes 310 (i.e., transactions including control information) are posted only after the installation and inception of the system 100. This makes the modified SPV wallet lighter than the traditional SPV wallet. For example, if the system 100 was installed in March 2017, headers of transactions post March 2017 are stored in the modified SPV wallet of the NeuroNode 426. In some aspects, the modified SPV wallet identifies blocks containing transactions related to the system 100 and store only the identified relevant blocks. In particular, a feature such as the bloom filter, can be used to identify transactions that are relevant and related to the system 100 and/or transactions that were posted by the blockchain wallets 432 included in the NeuroCloud 340. In this manner, the modified SPV is made lightweight.

In some implementations, the modified SPV does not relay the transactions to any other node on the blockchain 330. Hence, the modified SPV in the NeuroNodes 426 do not include private keys. In this manner, other malware nodes cannot impersonate the NeuroNodes 426 with modified SPVs since the modified SPVs do not have private keys which could potentially be hacked to spoof. Thus, the modified SPV wallets in NeuroNodes 426 have public keys and no private keys.

Control information from the NeuroCloud 340 is relayed via blockchain 330 to the NeuroNodes 426 included in the device nodes 310. In order to determine if the NeuroNode 426 includes up to date transactions, the size of the blockchain 330 must be considered. Since the modified SPV wallet includes headers posted only after the inception of the system 100, a compensation mechanism is provided within the NeuroNode 426 to calculate and adjust the chain size so that blocks posted from inception of the system 100 only are considered. For example, if the system 100 was installed in March 2017, the chain size should consider blocks only from March 2017 onwards. The NeuroNode 426 determines if the blocks stored are up to date based on the adjusted chain size.

Control information such as blacklisted IP addresses, whitelisted IP address, malware signatures, port identifiers, and/or the like are relayed from the NeuroCloud 340 via the blockchain 330 to the modified SPV wallet. That is, blocks containing transactions with control information from the NeuroCloud 340 are stored in the modified SPV wallet. In some aspects, a blockchain reader function in the NeuroNode 426 enables the reading of the blocks and the corresponding transactions. The modified SPV wallet in a manner similar to traditional blockchain wallets, determines the balance for the transactions to extract the whitelisted IP addresses, blacklisted IP addresses, and malware signature. That is, at regular predetermined intervals, the modified SPV wallet determines the balance for the transactions that are posted on the SPV wallet. The SPV wallet then updates the command file with whitelisted IP address, blacklisted IP addresses, port identifiers, and malware signature. For example, if the NeuroCloud 340 relays "OP_RETURN ADD B 10.10.10" and "OP_RETURN MW Sig" to the NeuroNode 426, the blockchain reader posts the transactions to the modified SPV wallet. At a predetermined interval, the modified SPV wallet updates the balance. On updating the balance, the commands "ADD B 10.10.10" and "MW Sig" are added to the command file. The NeuroNode 426 reads the command file every 30 seconds consequently blocking blacklisted IP address and killing processes via Sigkill based on malware signatures.

In some aspects, the command file can include an identifier to distinguish between a blacklisted IP address and a whitelisted IP address. For example, the command "ADD B 10.10.10" could indicate that the address is blacklisted while the command "ADD W 10.10.10" could indicate that the address is whitelisted. In addition, command such as "MW" could indicate a malware signature. For example, "MW Sig" could indicate a malware with signature "Sig". In some aspects, in addition to relaying information regarding whitelisted IP addresses, blacklisted IP addresses, and malware signatures, the blockchain 330 could relay any information relating to the secure functioning of the device node 310 from the NeuroCloud 340.

In some aspects, the command file can also store the end state of the device node 310. For example, consider an LED light with two states "ON" and "OFF". If an application requires that the LED light always stay in "ON" state, a command with end state as "ON" state can be relayed from the NeuroCloud 340 to the device node 310 via the blockchain 330. The command file can store this end state and the NeuroNode 426 can control the processes running in the device node 310 based on this command. That is, the NeuroNode 426 can control the processes such that the LED light is always in "ON" state until a command to the contrary is relayed and stored on the command file.

NeuroPrime

In some aspects, a NeuroPrime 360 can be a management server that controls and monitors all NeuroClouds 340, rendezvous points 320 and NeuroNodes 310. The NeuroPrime 360 can implement machine learning algorithms to determine blacklisted IP addresses across all NeuroClouds 340. For example, in FIG. 1, NeuroPrime 360 can implement machine learning algorithms to determine blacklisted IP addresses across NeuroCloud 340a and 340b and hence across device nodes 310a-310d.

Dual-Factor Authentication

In traditional device nodes, a hacker has the ability to add a process to the system monitor on the device node thereby attacking the device node. In contrast, in systems and methods described herein (e.g., system 100 in FIG. 1), a process cannot be added directly to the system monitor. As described above, a system monitor for a device node is generated based on a list of sanctioned processes. This list of sanctioned processes is static for most part and cannot be modified without dual factor authentication.

In order to modify the list of sanctioned processes (e.g., adding a process to the list of sanctioned processes), a system administrator (e.g., system administrator for the IoT and/or device node) will have to send the process that is to be run on the device node to the NeuroCloud via the blockchain. The NeuroCloud analyzes this process and if the NeuroCloud approves of the process, the NeuroCloud transmits a transaction by including this process as control information. The NeuroNode obtains this control information (e.g., using methods and systems disclosed herein) from the blockchain and modifies its list of sanctioned processes. Put differently, the NeuroNode obtains this process via the blockchain and adds this process to the list of sanctioned processes.

In order to run this newly added process, the system administrator sends a request to the NeuroNode to run this process. The NeuroNode compares the process to the modified list of sanctioned processes and then runs the process based on the comparison (i.e., if the process is listed in the modified list of sanctioned processes). Therefore, the process is first authenticated using blockchain and then authenticated again via the NeuroNode based on a modified list of sanctioned processes (system monitor). In this manner, the systems and methods disclosed herein perform dual-factor authentication.

Load Balancing

At a given point in time, different NeuroNodes can be in communication with the same rendezvous point. The rendezvous points however do not possess information of the IP addresses of the communicating NeuroNodes. Therefore, there could be a scenario where some rendezvous points are over-utilized while other rendezvous points are under-utilized. Thus, load balancing is another aspect of the system 100 disclosed herein.

In some aspects, the NeuroCloud can determine under-utilized and over-utilized rendezvous points by analyzing the hashed files of Network traffic data. In some aspects, an update can be transmitted via the blockchain to the NeuroNodes identifying the under-utilized rendezvous points. In this manner, the NeuroCloud can enable load balancing by monitoring the hashed files and transmitting commands to the NeuroNodes to communicate with under-utilized rendezvous points.

Figure 5:
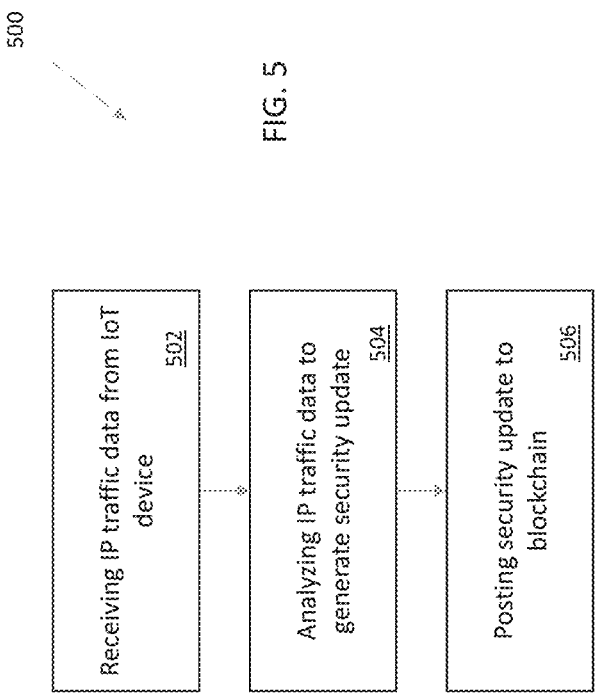
FIG. 5 is a flowchart illustrating a high-level overview of a process for controlling a device node in accordance with some aspects described herein.

FIG. 5 is a flowchart illustrating a high-level overview of a process 500 for controlling a device node (e.g., device node 310 in FIG. 1). At step 502, the process includes receiving IP traffic data at a NeuroCloud (e.g., NeuroCloud 340) from at least one device node. In one implementation, receiving this IP traffic data includes using public-private key pair (e.g., Diffie-Hellman exchange) to upload the IP traffic data from the device node 310. In some aspects, the public-private key pair is visible only to devices nodes, rendezvous points, and NeuroCloud within the mesh network that the NeuroCloud belongs to. In some aspects, the public-private key pair can be changed frequently (e.g., every 90 seconds). In some aspects, the IP traffic data is transmitted to the NeuroCloud via one or more rendezvous points (e.g., rendezvous server 320 in FIG. 1).

At step 504, the NeuroCloud analyzes the IP traffic data to generate a security update. In one aspect, the security update can be generated using one or more machine learning techniques. At step 506, the NeuroCloud posts the generated security update to a blockchain (e.g., blockchain 330 in FIG. 1). In one implementation, the NeuroCloud includes the security update in a transaction data message and posts the transaction data message from one blockchain wallet (e.g., blockchain wallet 432 in FIG. 4) in the NeuroCloud to the other blockchain wallet e.g., blockchain wallet 432 in FIG. 4) in the NeuroCloud using the address of the other blockchain wallet. The transaction data message is then posted to the blockchain. In some implementations, the blockchain is a bitcoin blockchain. In some implementation, the blockchain is an Ethereum blockchain.

In some aspects, the security update can include 1) whitelisted IP addresses from which the device node is permitted to accept Internet communications; 2) blacklisted IP addresses from which the device node is not permitted to accept Internet communications; 3) process identifiers for respective sanctioned processes that are permitted to be executed on the device node; 4) malware signatures; 4) port identifiers identifying ports of the device node for which communications between the device node and the Internet are blocked.

Figure 6:
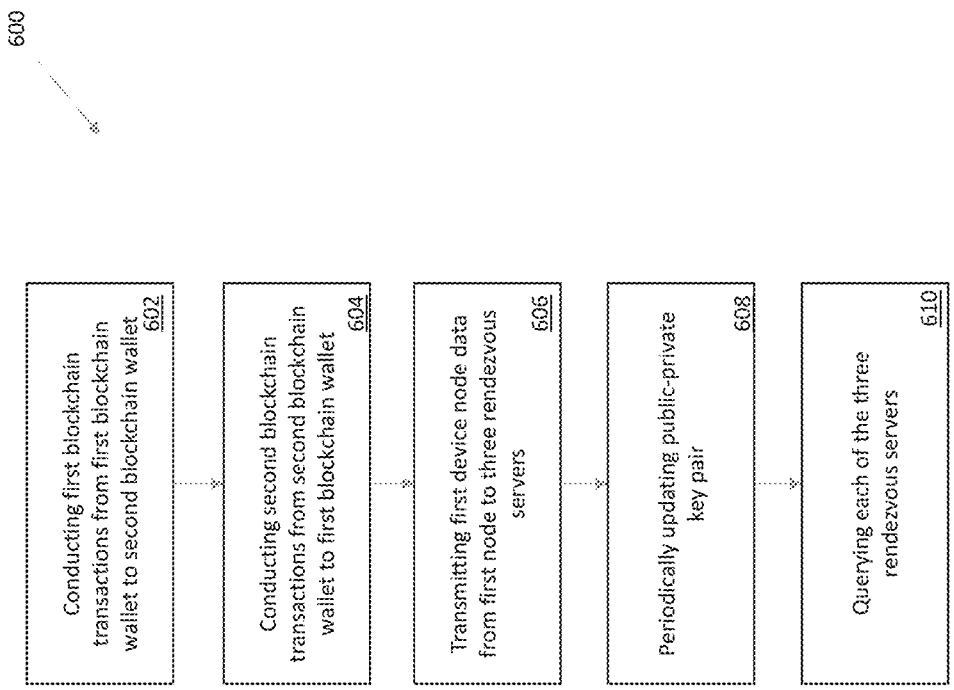
FIG. 6 is a flowchart illustrating an example method for controlling a device node in accordance with some aspects described herein.

FIG. 6 is a flowchart illustrating an example method 600 for controlling a device node (e.g., device node 310 in FIG. 1). At step 602, the method 600 includes conducting first blockchain transactions from a first blockchain wallet (e.g., blockchain wallet 432a or blockchain wallet 432b in FIG. 4) having a first address to a second blockchain wallet (e.g., blockchain wallet 432a or blockchain wallet 432b in FIG. 4) having a second address. For instance, the method can include conducting first blockchain transactions from blockchain wallet 432a to blockchain wallet 432b or conducting first blockchain transactions from blockchain wallet 432b to blockchain wallet 432a. Each of these blockchain wallets can include a respective address. In some aspects, the first blockchain transactions can include a command and/or a parameter for a device node. In some aspects, the first blockchain transactions can also include the address of a blockchain wallet. For example, if the first blockchain transactions are conducted from blockchain wallet 432a to blockchain wallet 432b, the first blockchain transactions can include the address of the blockchain wallet 432b. In a similar manner, if the first blockchain transactions are conducted from the blockchain wallet 432b to blockchain wallet 432a, the first blockchain transactions can include the address of blockchain wallet 432a. In some aspects, the first blockchain transactions can be posted to a blockchain (e.g., blockchain 330 in FIG. 1).

In a manner similar to step 602, at step 604, the method 600 includes conducting second blockchain transactions from the second blockchain wallet to the first blockchain wallet. At 606, the method 600 includes transmitting device node data from a device node to at least three rendezvous servers (e.g., rendezvous servers 320 in FIG. 1). In some aspects, the device node data can be transmitted using Diffie-Hellman encryption protocol. At step 608, the method 600 includes periodically updating the public-private key pair of the Diffie-Hellman protocol used by the device node to transmit the device node data from the device node to the three rendezvous servers. At 610, the method 600 includes querying each of the three rendezvous servers for the device node data. In some aspects, a copy of the device node data is uploaded to a management server (e.g., NeuroCloud 340 in FIG. 1) when a majority of the three rendezvous server have the same device node data.

In this manner, the present disclosure details implementations of, methods, apparatus, and systems for controlling internet-connected devices having embedded systems with dedicated functions.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for controlling a plurality of Internet-coupled device nodes (310*a*, 310*b*), the method comprising:
   A) conducting first blockchain transactions from a first blockchain wallet having a first address to a second blockchain wallet having a second address, wherein:
      the first blockchain transactions include the second address and at least one first node command and/or at least one first node parameter for at least a first device node (310*a*) of the plurality of Internet-coupled device nodes;
      the first blockchain transactions are posted to a first blockchain (330*a*);
   B) conducting second blockchain transactions from the second blockchain wallet to the first blockchain wallet, wherein:
      the second blockchain transactions include the first address and at least one second node command and/or at least one second node parameter for the at least one first device node (310*a*) or at least one second device node of the plurality of Internet-coupled device nodes; and
      the second blockchain transactions are posted to the first blockchain;
   C) transmitting first device node data from the first device node to at least three rendezvous servers using an encryption protocol;
   D) periodically updating a public-private key pair used by the first device node in C) to transmit the first device node data to the at least three rendezvous servers; and
   E) querying each of the at least three rendezvous servers for the first device node data;
   F) determining that a majority of the at least three rendezvous servers has the same node data; and
   G) uploading a copy of the first device node data to at least one first management server based upon the determination that a majority of the at least three rendezvous servers has the same first node data.

2. The method of claim 1, wherein:
   the first device node (310*a*) constitutes an embedded system with at least one dedicated function and comprises:
      a memory (210) storing an operating system (422*b*), dedicated function firmware (424*b*), and device management firmware (426);
      a processor (220) coupled to the memory to execute the dedicated function firmware and the device management firmware via the operating system, wherein upon execution of the dedicated function firmware, the processor controls the first device node to perform the at least one dedicated function; and a communication interface (230), communicatively coupled to the processor and the Internet, to facilitate Internet communications between the first device node and the Internet, wherein the method further comprises:

controlling the communication interface to receive, via the Internet, the at least one first node command and/or the at least one first node parameter for at least the first device node included in at least one of the first blockchain transactions; and implementing at least one device management process to control the first device node based at least in part on the at least one first node command and/or the at least one first node parameter.

3. The method of claim 2, wherein:

the at least one first node command and/or the at least one first node parameter included in the at least one of the first blockchain transactions constitutes at least one security update for the first device node;

the at least one device management process performed by the first device node includes at least one device security process; and the method further comprises:

controlling the communication interface to receive, via the Internet, the at least one security update for the first device node included in the at least one of the first blockchain transactions; and implementing the at least one device security process to control the first device node based at least in part on the received at least one security update.

4. The method of claim 2, wherein the at least one first node command and/or the at least one first node parameter included in the at least one of the first blockchain transactions includes at least one of:

at least one whitelisted IP address from which the first device node accepts the Internet communications from the Internet;

at least one blacklisted IP address from which the first device node does not accept the Internet communications from the Internet;

an identifier for a whitelisted process that is permitted to be executed as part of execution by the processor of the dedicated function firmware; and a regular expression string corresponding to a malware signature.

5. The method of claim 2, wherein:

the communication interface of the first device node includes a plurality of ports having respective port identifiers; and the at least one first node command and/or the at least one first node parameter includes at least one port identifier of at least one port of the plurality of ports for which communications between the first device node and the Internet are blocked.

6. The method of claim 1, wherein the first device node data transmitted in C) includes network traffic data relating to Internet communications received and/or transmitted by the communication interface of the first device node.

7. The method of claim 6, wherein C) further comprises:

intercepting and analyzing IP packets of Internet communications received by the first device node;

generating an IP packet log based at least on respective headers of the intercepted and analyzed IP packets;

transmitting the IP packet log as network traffic data included in the first device node data from the first device node to the at least three rendezvous servers.

8. The method of claim 7, wherein E) comprises:

hashing the network traffic data in the IP packet log; and uploading the hashed network traffic data to the at least one first management server as the copy of the first device node data when the majority of the at least three rendezvous servers has the same first node data.

* * * * *